United States Patent [19]

Negus

[11] Patent Number: 5,133,628
[45] Date of Patent: Jul. 28, 1992

[54] CYLINDER BORE RIDGE REMOVING TOOL

[75] Inventor: Joel A. Negus, Clarinda, Iowa

[73] Assignee: Lisle Corporation, Clarinda, Iowa

[21] Appl. No.: 617,193

[22] Filed: Nov. 23, 1990

[51] Int. Cl.⁵ .......................... B23C 3/12; B23C 1/20
[52] U.S. Cl. ................................ 409/138; 51/170 PT;
144/253 D; 409/179; 409/180
[58] Field of Search ........... 144/117 B, 134 D, 136 C,
144/253 D; 409/138, 180-182, 179; 51/170 PT

[56] References Cited

U.S. PATENT DOCUMENTS

| 2,304,405 | 12/1942 | Green | 409/179 |
| 3,085,476 | 4/1963 | Sloan et al. | 409/181 |
| 3,360,023 | 12/1967 | Rutzebeck | 144/134 D |
| 4,033,229 | 7/1977 | Sarnelli, Jr. | 408/182 X |
| 4,964,765 | 10/1990 | Kishi | 144/117 B X |

OTHER PUBLICATIONS

"Carbide Cutter", shown in NASA Tech Briefs, May 1990, purportedly designed by Messrs. Guirguis and Price of Rockwell International Corp. for Marshall Space Flight Center.
Tool No. 36500, Ridge Reamer, shown in Lisle Catalogue (section Engine/7).
Tool No. 38000, Lathe Type Ridge Reamer, shown in Lisle Catalogue (section Engine/7).

Primary Examiner—Steven C. Bishop
Attorney, Agent, or Firm—Allegretti & Witcoff, Ltd.

[57] ABSTRACT

An improved tool for grinding a ridge in a bore comprises a planar base plate which is positioned over the bore, a handle along one edge of the base plate and a cutter tool projecting from the plate on the other extreme or diameter of the plate. The cutter tool cooperates with a rotary driven tool to provide a cutting action against the peripheral ridge in a cylinder bore, for example.

5 Claims, 2 Drawing Sheets

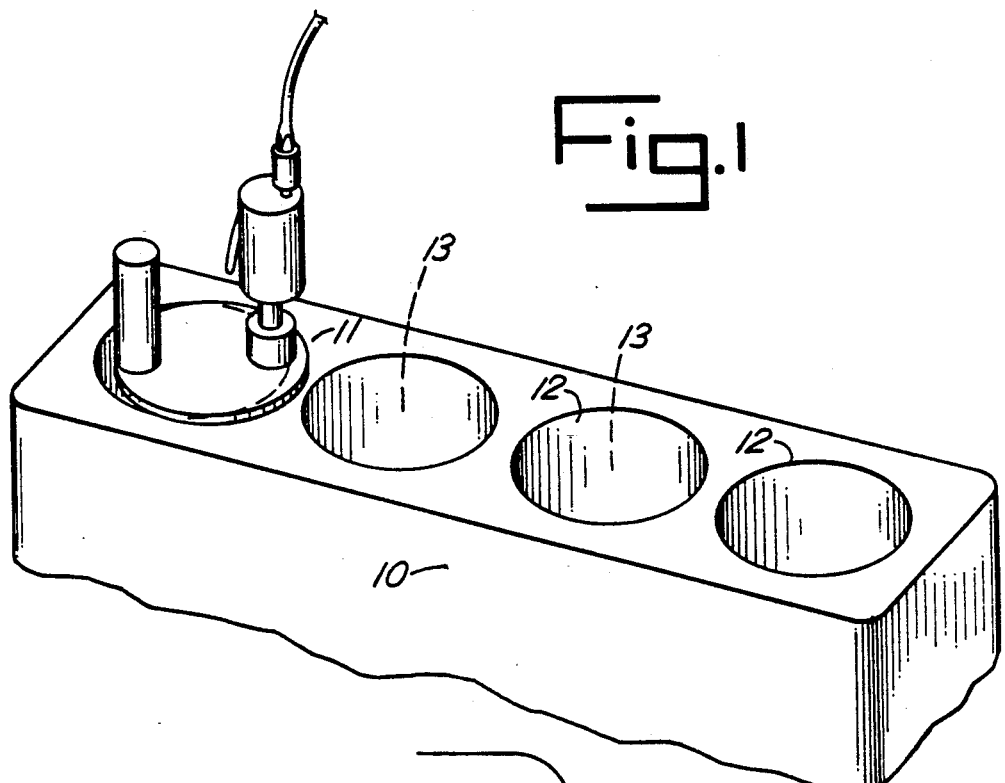
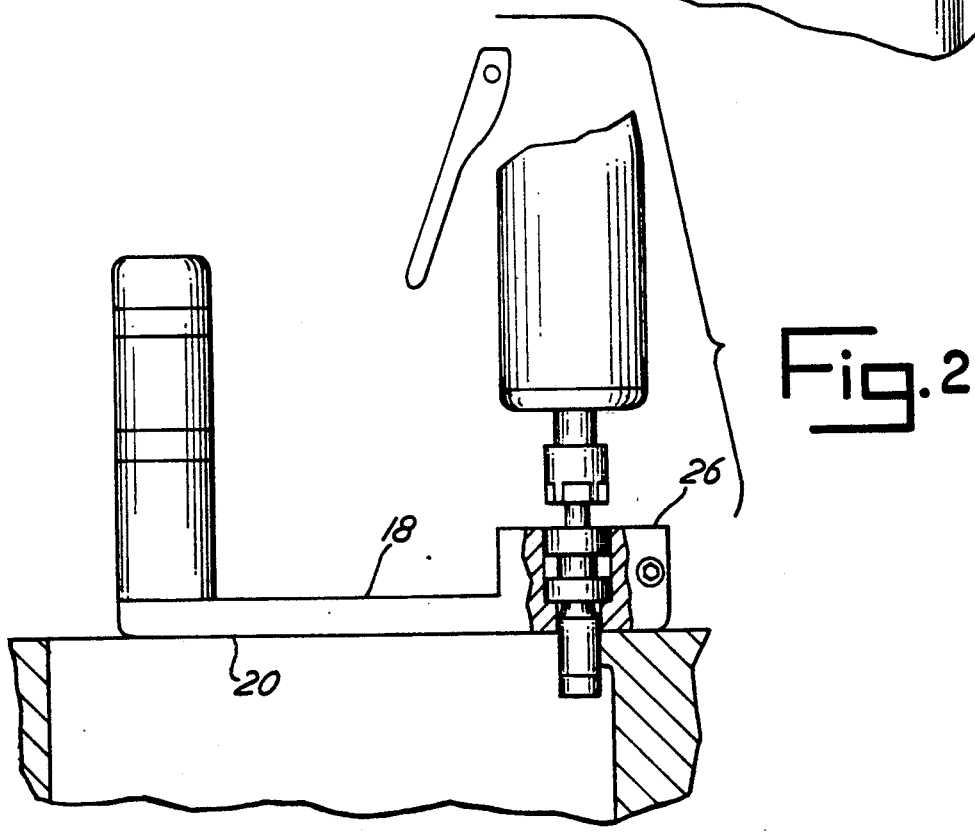

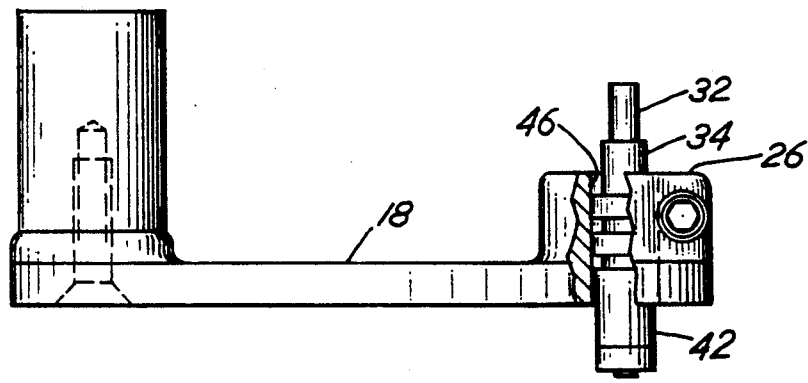
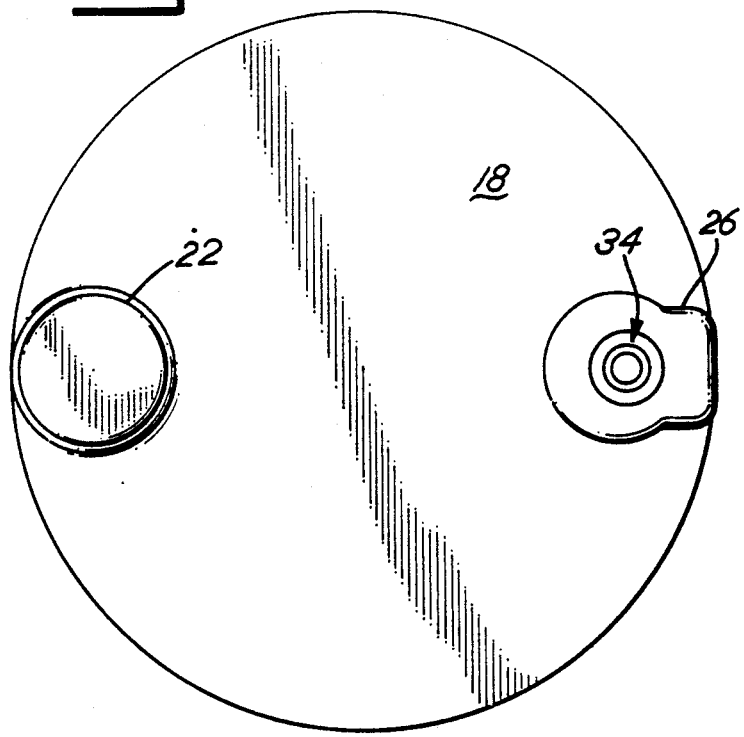
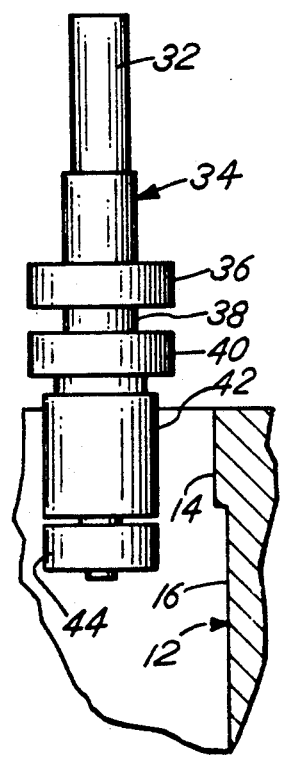

CYLINDER BORE RIDGE REMOVING TOOL

BACKGROUND OF THE INVENTION

This invention relates to an improved tool for grinding the internal surface in a bore and more, particularly a ridge around the upper edge of a cylindrical bore.

When servicing internal combustion engines, it is often necessary to replace piston rings and pistons in those engines. Also, the reciprocation of a piston within a cylinder will often result in the wear of the cylinder bore walls such that the diameter of the cylinder bore is increased in the engine block. Typically, however, the wear is not uniform and the ridge forms about the upper peripheral edge of the cylinder bore. When replacing a piston and rings, therefore, it is necessary and desirable to remove this peripheral ridge from the bore in the engine block so that the old piston can be removed from the bore.

Mechanisms have been utilized in the past to effect such a role, including hand operated cylinder ridge reaming tools. For example, U.S. Pat. Nos. 2,834,232 and 2,780,115 disclose a typical hand operated cylinder ridge reaming tool.

While these prior art devices have worked well, various drawbacks are noted. For example, hand operated ridge reamers are very slow and require much manual effort from the operator. Further, they are more complicated to set up and more restrictive in bore sizes they will accommodate. Thus, there has remained the need for an improved tool for grinding the peripheral ridge in a cylinder bore of an internal combustion engine. Further, there has remained a need for a tool which can be attached to a rotary air motor to remove a ridge along the peripheral edge of a cylindrical bore.

SUMMARY OF THE INVENTION

In a principal aspect, the present invention comprises a planar base plate having a handle along one edge and a rotary cutter tool projecting through a mounting clamp on the opposite edge. The cutter tool is retained within bearings in the mounting clamp so that it may be driven by means of a rotary tool, such as a rotary driven air tool. The plate is maintained in position by manually gripping the handle as well as the air tool which is attached to the drive shank of the cutter tool in the mounting clamp. The cutter tool projects below the surface of the plate and engages against a ridge which is to be cut along the upper edge of the cylinder bore. A bearing is provided at the lower end of the shank on which the cutter is mounted. The bearing defines a stop which limits the movement of the cutter against the cylinder bore wall.

Thus, it is an object of the invention to provide an improved tool for removal of the ridge from a cylinder bore wall of an engine block.

A further object of the invention is to provide a new and improved method and tool for removal of the ridge from a cylinder bore.

Yet another object of the invention is to provide a new tool for removal of a ridge from a cylinder bore wall which can be utilized in combination with existing rotary tools, such as a rotary driven drill or screwdriver.

Yet a further object of the present invention is to provide an improved tool for removing a ridge from a cylinder bore wall wherein the tool has a minimum number of movable parts, is inexpensive, and yet which provides for accurate removal of such ridges.

These and other objects, advantages and features of the invention will be set forth in the Detailed Description which follows.

BRIEF DESCRIPTION OF THE DRAWING

In the Detailed Description which follows, reference will be made to the drawing comprised of the following FIGURES:

FIG. 1 is a perspective view of an engine block having cylinder bores therein wherein the tool of the invention is shown positioned for appropriate grinding of the bores;

FIG. 2 is an enlarged side partial sectional view of the improved tool of the present invention in a position for grinding the ridge of a cylinder bore;

FIG. 3 is a side view of the improved tool of the invention;

FIG. 4 is a top plan view of the improved tool of the invention;

FIG. 5 is an enlarged side view of the cutter of the improved tool of the invention juxtaposed with respect to a cylinder bore wall.

DESCRIPTION OF THE PREFERRED EMBODIMENT

FIG. 1 depicts an engine block which is positioned for refurbishment by means of the tool of the invention. Thus, engine block 10 typically will include a series of cylindrical openings or bores 12. When an engine is being serviced, for example, by replacement of pistons and/or rings, the original uniform bore 12 is no longer uniform due to wear of the cylinder walls. Most typically a circumferential or peripheral ridge 14 forms along the upper peripheral edge of the cylinder bore 12. The remaining wall 16 of the cylinder is recessed or has a greater diameter relative to the diameter associated with the ridge 14. This dimensional difference results from wear caused by movement of the rings and piston against the cylinder wall of the internal combustion engine. Removal of the ridge 14 is desired in such an event and has been effected heretofore by means of honing tools, ridge reamers, or various other re-boring tools.

The tool of the present invention includes a generally planar, circular base plate 18 which includes a bottom planar surface 20. The configuration of the base plate 18 is preferably circular as indicated, however, this is not a limiting feature of the invention. The base plate 18 is configured so that it will fit over the top of the engine block 10 and thereby stabilize the tool relative to the axis 13 of the bores 12. Thus, as depicted in FIG. 1 the base plate 18 is configured in a shape and size so as to overlap the top 11 of the block 10. Planar surface 20 is planar for the reason that it will fit against the top surface 11 of the block 10 thereby maintaining the tool in the desired orientation.

A handle 22 projects axially upward from one side the base 18 and is attached thereto by means of a threaded bolt 24 as depicted in FIG. 3. The handle 20 is generally in the shape of a rod or cylinder so any compatible manually grippable handle construction may be utilized. In the preferred embodiment the handle 18 is positioned adjacent one-side surface or one-side of the plate 18. Arranged on the opposite side of the plate 18 from the handle 22 is a clamp mechanism 26. The clamp mechanism 26 serves as a tool holder for a carbide cutter tool 28. The cutter tool 28 is shown in greater detail in FIG. 5. This tool is retained in the clamp 26 by means of a clamp screw 30 which grips the opposite sides of the clamp and tightens that clamp down upon the cutter tool 28.

The cutter tool 28 is comprised of a drive shank 32 with a collar 34 fixed onto the shank to retain a first bearing 36, a spacer 38, a second bearing 40 and a carbide cutter wheel 42. Another bearing 44 is attached and retained on the lower end of the shank 32. Note, the diameter of the bearing 44 is substantially equal to the diameter of the carbide cutter wheel 42. The outside surface wheel 42 constitutes a cutter blade which is effective to cut away a metal as the shank is rotatably driven.

The assembly depicted in FIG. 5 is retained within the clamp 26 by tightening the clamp screw 30. Specifically, the clamp 26 includes a tube bore 46 having a diameter substantially the same as the diameter of the bearings 36 and 40. The bearings 36 and 40 are then positioned within the bore 46 as the clamp screw 30 is tightened. This retains the assembly. The shank 32 may then be rotated to effectively rotate the cylindrical carbide cutter wheel 42. Note, the cylindrical carbide cutter wheel 42 extends below the planar surface 20. The depth or amount of extension is dependent upon, of course, upon the positioning of the bearings 36 and 40 within the throughbore 46. The depth is thus adjustable.

Note, with two bearings 36 and 40 which are spaced axially along the shank 32 the rigidity of the cutter wheel 42 and the stability of the cutter wheel 42 is maintained and improved. In the preferred embodiment at least two spaced bearings 36 are preferred or, alternatively, an elongated single bearing.

In operation a rotary vane air motor tool such as a grinder tool, screw driver, drill or the like is keyed to the shank 32. The shank 32 is rotated by the tool to thereby rotate the carbide cutter wheel 42. As depicted in FIGS. 2 and 5, the cutter wheel 42 is juxtaposed or arranged so as to engage the ridge 14 cutting away the ridge 14 and thereby rendering the cylinder wall 16 uniform. The configuration of the plate 18 as previously explained maintains the proper orientation of the cutter wheel 42 relative to the ridge 14. The bearing 44 is spaced from the planar surface to a sufficient distance to permit the entire surface of the ridge 14 to be exposed to the cutter wheel 42. The bearing 44 thus acts against surface 16 as a stop to control the depth of cut by the cutter wheel 42.

It is possible to vary the construction and configuration of the invention by altering or interchanging the various parts. The shape of the base plate, for example, may be altered. The orientation of the cutter wheel and the shape of the cutter wheel may be altered. Various other alterations and changes may be made in the spirit of scope and the scope of the invention. Thus, the invention is to be limited only by the following claims and their equivalents.

What is claimed is:

1. An improved tool for grinding a peripheral ridge in a bore comprising, in combination:
   a generally planar base plate for positioning, at least in part, over the bore;
   handle means projecting from the base plate for holding the plate over the bore;
   a cutter tool holder in the plate adjacent one edge, said holder defining an axis extending through the plate, said axis being substantially perpendicular to the generally planar base plate;
   a cutter tool mounted in the tool holder for rotation about the axis, said cutter tool having a cutter surface and a drive shank;
   the drive shank projecting axially from the tool and having a collar, at least a first bearing, a guide bearing and a cutter wheel, the collar being fixed onto the shank and retaining the first bearing, guide bearing and cutter wheel in substantially fixed relation, the diameter of the guide bearing being substantially equal to the diameter of the cutter wheel, said shank rotatably mounted in the holder and supporting the cutter tool beyond the planar surface of the plate for engagement with a ridge, said shank projecting from the plate for engagement by drive means whereby the plate may be positioned over a bore with the handle used to maintain the plate in position and drive means are provided to drive the shank and attached cutter tool against a ridge along the periphery of the bore whereby the guide bearing acts against the bore as a stop and thereby controls the depth of cut by the cutter wheel.

2. The tool of claim 1 wherein the base plate is circular with the handle along one edge and the cutter tool holder along the opposite edge.

3. The tool of claim 1 wherein the tool holder comprises a cylindrical through bore in the plate and wherein said first bearing is retained in the throughbore.

4. The tool of claim 1, including a second bearing axially spaced from said first bearing.

5. The tool of claim 1 wherein the cutter wheel comprises a cylindrical member having a cylindrical cutter surface.

* * * * *